US012752442B2

(12) United States Patent

Kanada

(10) Patent No.: US 12,752,442 B2
(45) Date of Patent: Oct. 6, 2026

(54) METHODS AND APPARATUSES FOR ACQUIRING LEARNING DATA

(71) Applicant: CANON KABUSHIKI KAISHA, Tokyo (JP)

(72) Inventor: Satoru Kanada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1153 days.

(21) Appl. No.: 17/472,829

(22) Filed: Sep. 13, 2021

(65) Prior Publication Data

US 2022/0088802 A1 Mar. 24, 2022

(30) Foreign Application Priority Data

Sep. 23, 2020 (JP) ................................ 2020-158691

(51) Int. Cl.

| | |
|---|---|
| ***B25J 19/00*** | (2006.01) |
| ***G05B 23/02*** | (2006.01) |
| ***G06F 3/147*** | (2006.01) |
| ***G06Q 20/20*** | (2012.01) |

(52) U.S. Cl.

CPC .............. *B25J 19/00* (2013.01); *G06F 3/147* (2013.01); *G06Q 20/203* (2013.01)

(58) Field of Classification Search

None

See application file for complete search history.

(56) References Cited

U.S. PATENT DOCUMENTS 9,501,851 B2 * 11/2016 Cervelli .................. G06T 11/26
2014/0114897 A1 4/2014 Nakamura et al.
2014/0279795 A1 * 9/2014 Shibuya ............. G05B 23/0221 706/46
2014/0286621 A1 9/2014 Matsunaga et al.
2015/0095381 A1 4/2015 Chen et al.
2016/0217379 A1 7/2016 Patri et al.
2016/0217398 A1 7/2016 Unuma et al.
2016/0226720 A1 * 8/2016 Alexseyev .......... G06F 3/04847
2017/0193372 A1 7/2017 Schimert
2017/0242076 A1 * 8/2017 Yoshiura ............ G05B 23/0235

(Continued)

FOREIGN PATENT DOCUMENTS

CN 101005794 A 7/2007
CN 103620625 A 3/2014

(Continued)

OTHER PUBLICATIONS

Aug. 6, 2024 Office Action in Japanese Patent Application No. 2020-158691 (with English translation).

(Continued)

*Primary Examiner* — Ariel Mercado-Vargas
(74) *Attorney, Agent, or Firm* — Venable LLP

(57) ABSTRACT

A display apparatus for displaying physical quantity related to a state of a machine apparatus includes a processing portion. The processing portion is configured to display an image such that a distance between one piece of a plurality of extracted pieces of partial time-series data extracted from a time-series data of the physical quantity and another piece of the plurality of extracted pieces of partial time-series data is smaller than a distance between the one piece of the plurality of pieces of partial time-series data before extracted and the other piece of the plurality of pieces of partial time-series data before extracted.

19 Claims, 12 Drawing Sheets

(56) References Cited

U.S. PATENT DOCUMENTS

| | | | | |
|---|---|---|---|---|
| 2017/0257497 | A1* | 9/2017 | Ono | H04N 1/00506 |
| 2020/0134075 | A1* | 4/2020 | Park | G06F 16/285 |
| 2020/0151199 | A1* | 5/2020 | Nakamura | G06F 16/285 |
| 2020/0198128 | A1 | 6/2020 | Hatanaka | |
| 2020/0249651 | A1* | 8/2020 | Lee | G06N 3/045 |
| 2020/0254670 | A1* | 8/2020 | Horiuchi | G05B 13/0265 |
| 2021/0041329 | A1 | 2/2021 | Bowers, III et al. | |
| 2021/0191374 | A1 | 6/2021 | Minemoto et al. | |

FOREIGN PATENT DOCUMENTS

| | | | |
|---|---|---|---|
| CN | 104063708 | A | 9/2014 |
| CN | 104516894 | A | 4/2015 |
| CN | 106030565 | A | 10/2016 |
| CN | 106790008 | A | 5/2017 |
| CN | 110020739 | A | 7/2019 |
| CN | 111352388 | A | 6/2020 |
| CN | 112345827 | A | 2/2021 |
| JP | 2003-248494 | A | 9/2003 |
| JP | 2006-004212 | A | 1/2006 |
| JP | 2009-075029 | A | 4/2009 |
| JP | 2012-128840 | A | 7/2012 |
| JP | 2013-008234 | A | 1/2013 |
| JP | 2013-073387 | A | 4/2013 |
| JP | 2020-027540 | A | 2/2020 |
| JP | 2020-135213 | A | 8/2020 |
| JP | 2020-149290 | A | 9/2020 |
| WO | 2015/037064 | A | 3/2005 |
| WO | 2016-103611 | A1 | 6/2016 |
| WO | 2016/143140 | A | 9/2016 |

OTHER PUBLICATIONS

Copending U.S. Appl. No. 17/474,566, filed Sep. 14, 2021.

Mar. 7, 2025 Office Action in Chinese Patent Application Pub. No. 2011109000.1 (with English translation).

Jan. 15, 2026 Office Action in Chinese Patent Application Pub. No. 202111090000.1.

Jun. 2, 2026 Office Action in Japanese Patent Application No. 2025-020763 (with English translation).

* cited by examiner

FIG.4A

| DATE OF MEASUREMENT | CURRENT VALUE (A) |
|---|---|
| 2017/4/9 | 13 |
| 2017/4/9 | 13 |
| 2017/4/9 | 13 |
| 2017/4/9 | 19 |
| 2017/4/9 | 19 |
| 2017/4/9 | 23 |
| 2017/4/9 | 28 |
| 2017/4/9 | 29 |
| 2017/4/9 | 30 |
| 2017/4/9 | 31 |
| 2017/4/9 | 30 |
| 2017/4/9 | 25 |
| 2017/4/9 | 10 |
| 2017/4/9 | 4 |
| 2017/4/9 | 3 |
| 2017/4/9 | 2 |
| 2017/4/9 | 2 |
| 2017/4/9 | 2 |
| 2017/4/9 | 3 |
| 2017/4/9 | 4 |
| ⋮ | ⋮ |
| 2018/4/8 | 4 |
| 2018/4/8 | 4 |
| 2018/4/8 | 9 |
| 2018/4/8 | 11 |
| 2018/4/8 | 13 |
| 2018/4/8 | 13 |
| 2018/4/8 | 13 |

FIG.4B

| DATE OF ROBOT STOP |
|---|
| 2017/4/9 |
| 2017/4/16 |
| 2017/4/18 |
| 2017/4/20 |
| 2017/4/26 |
| 2017/5/4 |
| 2017/5/5 |
| 2017/5/8 |
| 2017/6/5 |
| 2017/6/22 |
| 2017/6/29 |
| 2017/7/5 |
| 2017/7/10 |
| 2017/7/17 |
| 2017/7/21 |
| 2017/7/24 |
| 2017/7/28 |
| 2017/7/29 |
| 2018/1/8 |
| 2018/1/14 |
| 2018/3/8 |
| 2018/3/15 |
| 2018/3/23 |
| 2018/4/7 |

WAVEFORM OF CONTINUOUS CYCLES

GRAPH WITH COMPRESSED TIME AXIS

DATE OF STOP BY FAILURE OF INDUSTRIAL ROBOT AND DETAILS

| DATE OF ROBOT STOP | DETAILS |
|---|---|
| 2017/5/4 | MOTOR LOAD |
| 2017/7/17 | BRAKE FAILURE |
| 2018/1/14 | BRAKE FAILURE |
| 2018/3/15 | MOTOR LOAD |

W

METHODS AND APPARATUSES FOR ACQUIRING LEARNING DATA

This application claims the benefit of Japanese Patent Application No. 2020-158691, filed Sep. 23, 2020, which is hereby incorporated by reference herein in its entirety.

BACKGROUND OF THE INVENTION

Field of the Invention

The present invention relates to an information processing method, an information processing apparatus, and the like.

Description of the Related Art

The operation state of a machine apparatus may gradually change, for example, due to the change in state of components of the machine apparatus. When the operation state of the machine apparatus is within an allowable range that is set for the purpose of use of the machine apparatus, the machine apparatus is in its normal state. In contrast, when the operation state of the machine apparatus is out of the allowable range, the machine apparatus is in a failed state. For example, if the machine apparatus is a production machine and operates in the failed state, the production machine will cause trouble such as manufacturing defective products or stopping the production line.

For preventing the failed state as much as possible, maintenance work is commonly performed regularly or irregularly on a machine apparatus, such as the production machine, even if the machine apparatus repeats an identical operation. For increasing preventive safety, it is effective that the intervals at which the maintenance work is performed are made shorter. However, if the frequency of maintenance work is excessively increased, the operation rate of the production machine will be lowered because the production machine is stopped during the maintenance work. Thus, it is preferable to detect a state of the production machine in which the production machine, although in its normal state, will have the failed state soon. This is because if the arrival of the failed state can be detected (predicted), the maintenance work can be performed on the production machine at a point of time when the arrival of the failed state is detected (predicted). As a result, the operation rate can be suppressed from lowering excessively.

In a known method of predicting the occurrence of failure, the machine learning is performed and a learned model is created in advance. The learned model has learned states of the machine apparatus; and in evaluation, the state of the machine apparatus is evaluated by using the learned model. For increasing the accuracy of prediction, it is important to create a learned model that is suitable for predicting the failure. For this reason, it is important to prepare learning data (training data) for a failure prediction model of the machine apparatus, which is created through the machine learning. For determining whether extracted data is suitable for the learning data, it is necessary to perform detailed data analysis, such as check and comparison of waveforms.

For example, in a data analysis method described in Japanese Patent Application Publication No. 2013-8234, a plurality of pieces of partial time-series data are extracted from time-series data in which physical quantities of a production machine and measurement times are associated with each other. The pieces of partial time-series data are plotted on a single graph that has an axis representing the elapsed time from a predetermined reference time. Then a user shifts each of the plotted pieces of partial time-series data in the elapsed-time axis direction so that the plotted pieces of partial time-series data have a common reference point. Through this operation, the user compares the pieces of partial time-series data with each other.

SUMMARY OF THE INVENTION

According to a first aspect of the present invention, an information processing method includes acquiring, by an information processing apparatus, time-series data of physical quantity related to a state of a machine apparatus, extracting, by the information processing apparatus, a plurality of pieces of partial time-series data from the time-series data, and displaying, by the information processing apparatus, an image such that a distance between one piece of a plurality of extracted pieces of partial time-series data and another piece of the plurality of extracted pieces of partial time-series data is smaller than a distance between the one piece of the plurality of pieces of partial time-series data before extracted and the other piece of the plurality of pieces of partial time-series data before extracted.

According to a second aspect of the present invention, an information processing apparatus includes a processing portion. The processing portion is configured to acquire time-series data of physical quantity related to a state of a machine apparatus, extract a plurality of pieces of partial time-series data from the time-series data, and display an image such that a distance between one piece of a plurality of extracted pieces of partial time-series data and another piece of the plurality of extracted pieces of partial time-series data is smaller than a distance between the one piece of the plurality of pieces of partial time-series data before extracted and the other piece of the plurality of pieces of partial time-series data before extracted.

According to a third aspect of the present invention, a display method of displaying physical quantity related to a state of a machine apparatus includes displaying an image such that a distance between one piece of a plurality of extracted pieces of partial time-series data extracted from a time-series data of the physical quantity and another piece of the plurality of extracted pieces of partial time-series data is smaller than a distance between the one piece of the plurality of pieces of partial time-series data before extracted and the other piece of the plurality of pieces of partial time-series data before extracted.

According to a fourth aspect of the present invention, a display apparatus for displaying physical quantity related to a state of a machine apparatus includes a processing portion. The processing portion is configured to display an image such that a distance between one piece of a plurality of extracted pieces of partial time-series data extracted from a time-series data of the physical quantity and another piece of the plurality of extracted pieces of partial time-series data is smaller than a distance between the one piece of the plurality of pieces of partial time-series data before extracted and the other piece of the plurality of pieces of partial time-series data before extracted.

Further features of the present invention will become apparent from the following description of exemplary embodiments with reference to the attached drawings.

BRIEF DESCRIPTION OF THE DRAWINGS

FIG. 4A is a diagram illustrating one example of time-series data collected by the time-series-data display apparatus.

FIG. 4B is a diagram illustrating one example of event data collected by the time-series-data display apparatus.

DESCRIPTION OF THE EMBODIMENTS

Figure 1:
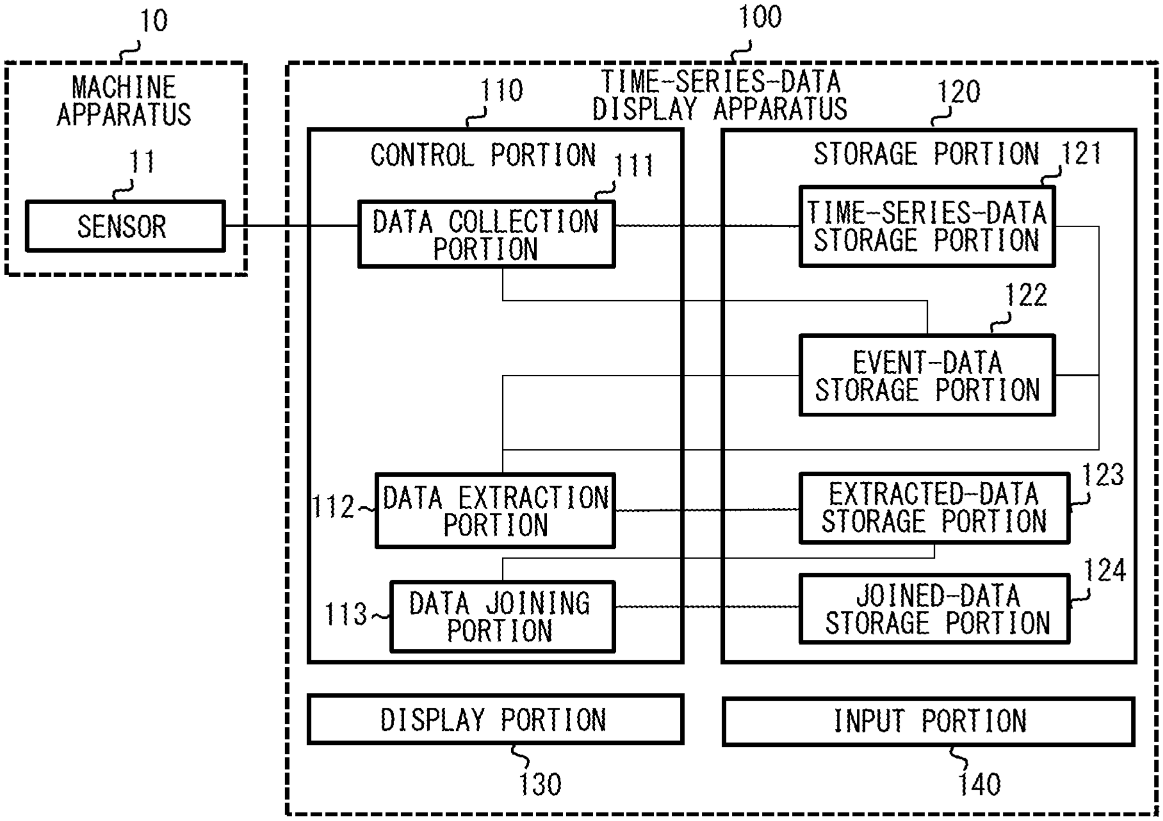
FIG. 1 is a schematic functional block diagram for illustrating function blocks of a time-series-data display apparatus of an embodiment.

In general, measurement is performed on a machine apparatus for acquiring various parameters (physical quantities) for managing the operation state of the machine apparatus. Thus, enormous amount of time-series data is acquired. For creating a learned model that is suitable for predicting the failure of the machine apparatus, it is necessary that pieces of data are appropriately extracted from the enormous amount of data that has been acquired, and that detailed analysis work, such as check and comparison of waveforms, is performed for determining whether the extracted data is suitable for the learning data.

However, since a machine apparatus, such as an industrial robot installed in a production line, generally has less frequency of failure, it is necessary to collect the time-series data for a long period of time. Since the time-series data to be collected is data used for managing the operation state of the machine apparatus, there are many measurement parameters for the data, and the sampling rate is set high for analyzing the waveforms in detail. As a result, the amount of collected data becomes enormous. Thus, in such a case in which a piece of data that is related to a failure and that occurred irregularly is to be extracted for performing comparison or the like, from the data collected at the high sampling rate in the long period of time, the conventional data display method causes high load on a worker, lowering the efficiency and accuracy of the work.

In the simplest method, the time-series data is displayed on a single graph with a horizontal axis that represents measurement time. In this case, however, since a plurality of pieces of partial data related to a failure will be irregularly scattered in a long time axis, the pieces of partial data related to the failure may not necessarily be displayed on a screen. If the time-series data is compressed in the time-axis direction for displaying the pieces of partial data on the screen, the waveform displayed in the graph will be deformed and lose features even though the time-series data was measured at the high sampling rate. As a result, it becomes difficult to check and compare waveforms. In addition, for analyzing the waveforms in detail, an operator has to perform operations, such as partially enlarging a waveform, by himself or herself. As a result, it takes enormous time to perform the data analysis work.

In the technique described in Japanese Patent Application Publication No. 2013-8234, pieces of partial time-series data to be added to a comparison graph are selected and extracted from enormous amount of time-series data that has been acquired. The extracted pieces of partial time-series data are then provided with elapsed time, and displayed on the comparison graph such that one is displayed on another, and that the extracted pieces of time-series data are in phase with each other in the elapse-time axis. Since the plurality of pieces of partial time-series data are positioned on the comparison graph so as to be in phase with each other in the elapsed-time axis, a worker can compare the pieces of partial time-series data with each other. However, the operations of the worker are troublesome.

For this reason, it has been desired to achieve an information processing method and an information processing apparatus that simplify the operations required when a plurality of pieces of partial data are extracted from the time-series data collected at a high sampling rate in a long period of time and when the data analysis work, such as check and comparison of waveforms, is performed.

Next, an information processing method and an information processing apparatus of an embodiment of the present invention will be described with reference to the accompanying drawings.

Note that in the drawings that are referred to in the following embodiments, a component given an identical reference numeral has an identical function, unless otherwise specified.

FIG. 1 is a schematic diagram for illustrating a configuration of function blocks of an information processing apparatus of an embodiment. Note that in FIG. 1, the function blocks represent functional elements that are necessary for describing features of the embodiment. Thus, other function blocks that are commonly used and that are not directly related to the principle of the present invention for solving the problem are not illustrated. In addition, since the functional elements of FIG. 1 are illustrated conceptually so that the functions of the elements can be understood, the elements may not necessarily be connected with each other physically as illustrated in FIG. 1. For example, a specific configuration in which function blocks are distributed or unified is not limited to the example illustrated in the figure, and part or all of the function blocks may be functionally or physically distributed or unified in a predetermined unit, in accordance with a use state or the like.

As illustrated in FIG. 1, a time-series-data display apparatus 100 of an embodiment that serves as an information processing apparatus is communicatively connected with a machine apparatus 10 to be measured.

The machine apparatus 10 is one of various industrial apparatuses, such as industrial robots and production apparatuses disposed in production lines. The machine apparatus 10 has various sensors 11 disposed for measuring physical quantities related to the state of the machine apparatus 10. For example, if the machine apparatus 10 is an articulated robot, the machine apparatus 10 may have sensors for measuring current values of motors that drive the joints, sensors for measuring angles of the joints, and sensors for measuring velocity, vibration, and sound, for example. Note that since the above-described sensors are merely examples, appropriate types of and an appropriate number of sensors may be disposed at appropriate positions as the sensors 11, depending on a type of the machine apparatus 10 and a use for the machine apparatus 10. Examples of the sensors 11 may include force sensors, torque sensors, vibration sensors, sound sensors, image sensors, distance sensors, temperature sensors, humidity sensors, flow sensors, pH sensors, pressure sensors, viscosity sensors, and gas sensors. Note that although FIG. 1 illustrates a single sensor 11 for convenience of illustration, a plurality of sensors is commonly disposed so as to be able to communicate with the time-series-data display apparatus 100.

The machine apparatus 10 is connected with the time-series-data display apparatus 100 wirelessly or via wire, such that the machine apparatus 100 can communicate with the time-series-data display apparatus 100 that serves as an information processing apparatus. Thus, the time-series-data display apparatus 100 can acquire data measured by the sensors 11, through the communication. Hereinafter, function blocks of the time-series-data display apparatus 100 will be described in a sequential manner. The time-series-data display apparatus 100 includes a control portion 110, a storage portion 120, a display portion 130, and an input portion 140.

The control portion 110 includes a plurality of function blocks, which is achieved by a CPU of the time-series-data display apparatus 100 reading and executing a control program stored, for example, in a storage device or a non-transitory recording medium. In another case, part or all of the function blocks may be achieved by a hardware component, such as an ASIC, included in the time-series-data display apparatus 100.

The storage portion 120 includes a time-series-data storage portion 121, an event-data storage portion 122, an extracted-data storage portion 123, and a joined-data storage portion 124. These portions of the storage portion 120 are appropriately allocated to a storage area of a storage device, such as a hard-disk drive, a RAM, or ROM. The storage portion 120 is a data storage portion, which stores various types of data necessary for creating an image that allows a user to easily view the time-series data.

The display portion 130 and the input portion 140 are user interfaces of the time-series-data display apparatus 100. The display portion 130 may include a display device, such as a liquid crystal display or an organic electroluminescent display. The input portion 140 may include an input device, such as a keyboard, a jog dial, a mouse, a pointing device, or a voice input device.

A data collection portion 111 of the control portion 110 acquires time-series data and event data related to the machine apparatus 10, from the machine apparatus 10; and stores the time-series data in the time-series-data storage portion 121, and the event data in the event-data storage portion 122. The data collection portion 111 may be referred to as a data acquisition portion.

The data collection portion 111 collects the time-series data, and stores the time-series data in the time-series-data storage portion 121. The time-series data represents physical quantities, such as current, velocity, pressure, vibration, sound, and temperature of each portion, that are related to the state of the machine apparatus and measured by the sensors 11 of the machine apparatus 10. In another case, the data collection portion 111 may acquire measurement values from the sensors 11, calculate a value, such as a maximum value, a minimum value, an average value, an integrated value, a value obtained by performing integration in frequency domain, a derivative value, or a second derivative value, from the measurement values in each period of time that is predetermined, and store a resultant value m the time-series-data storage portion 121.

In addition, the data collection portion 111 collects event data related to an event that has occurred in the machine apparatus, and stores the event data in the event-data storage portion 122. The event is set when the machine apparatus has a predetermined state. For example, the data collection portion 111 collects information on time, as event data, at which an event has occurred; and stores the time information in the event-data storage portion 122. For example, if the event is a stop state of the machine apparatus that usually performs repeated operations (cycle operations), the data collection portion 111 stores a date and time of occurrence of the stop state, in the event-data storage portion 122. The event, such as failure or maintenance, of the machine apparatus that causes the stop state is generally irregular and occurs at long intervals. Thus, the information processing apparatus of an embodiment is suitable for handling such an event that occurs discretely and irregularly in time.

A data extraction portion 112 extracts a piece of partial time-series data related to an event, from the time-series data stored in the time-series-data storage portion 121, depending on the event data stored in the event-data storage portion 122; and stores the piece of partial time-series data in the extracted-data storage portion 123.

For example, if the extraction condition is a stop of the machine apparatus, the data extraction portion 112 reads, as event data, data on a date and time at which the machine apparatus stopped, from the event-data storage portion 122. Depending on the event data, the data extraction portion 112 extracts measurement values that were collected by a sensor in an operation cycle preceding the cycle in which the machine apparatus stopped; and stores the measurement values in the extracted-data storage portion 123, as partial time-series data. In another case, the data extraction portion 112 extracts from the time-series-data storage portion 121, a value, such as a maximum value, a minimum value, an average value, an integrated value, a value obtained by performing integration in frequency domain, a derivative value, or a second derivative value, that was calculated from measurement values obtained in a predetermined time of an operation cycle that precedes the cycle in which the machine apparatus stopped. Then the data extraction portion 112 stores the value in the extracted-data storage portion 123, as partial time-series data.

Note that although the description has been made for the case where the process is performed for the event data stored in the event-data storage portion 122 and corresponding to a single type of events, there may be a case in which the event-data storage portion 122 stores event data related to a plurality of types of events. In this case, an operator may select, via the input portion 140, a type of events from the plurality of types of events; and the data extraction portion 112 extracts a piece of partial time-series data related to the selected type of events, and store the extracted piece of partial time-series data in the extracted-data storage portion 123. In another case, a type of events selected from the plurality of types of events may be registered in advance. In this case, a piece of partial time-series data related to the registered type of events may be automatically extracted, and stored in the extracted-data storage portion 123.

The data joining portion 113 uses pieces of partial time-series data stored in the extracted-data storage portion 123, and creates a graph in which the pieces of partial time-series data related to a type of events are aligned. The data joining portion 113 may be referred to as an image forming portion. For example, the data joining portion 113 creates a graph in which the pieces of partial time-series data related to the type of events are joined with each other, or disposed close to each other in the horizontal axis that represents the number of pieces of data or the like; and stores the joined data in the joined-data storage portion 124. The graph can be displayed on the display portion 130 or printed by using a printing apparatus (not illustrated), if a worker (operator) needs to do so.

Figure 2:
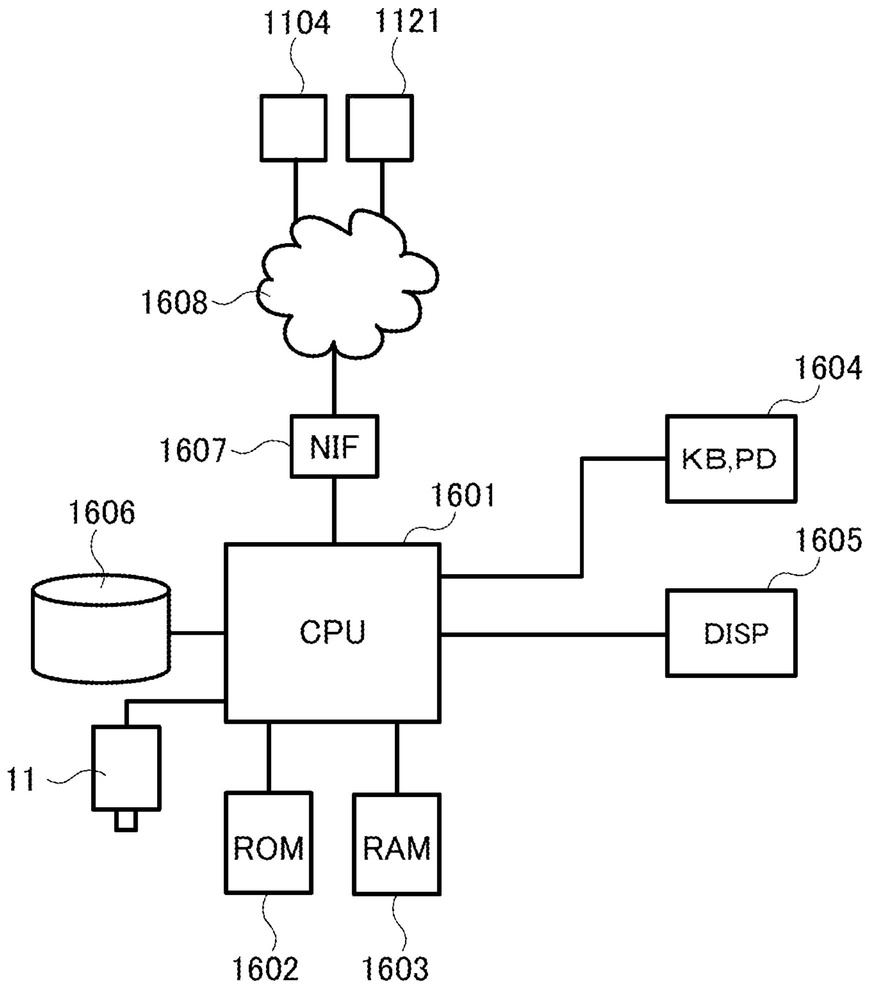
FIG. 2 is a diagram schematically illustrating one example of hardware configurations of the time-series-data display apparatus of an embodiment.

FIG. 2 schematically illustrates one example of hardware configurations of the time-series-data display apparatus of an embodiment. As illustrated in FIG. 2, the time-series-data display apparatus includes a PC hardware, which includes a CPU 1601 that serves as a main control portion, and a ROM 1602 and a RAM 1603 that serve as storage devices. The ROM 1602 stores information, such as a processing program, that achieves a later-described information processing method. The RAM 1603 is used, for example, as a work area of the CPU 1601 when the CPU 1601 performs the information processing method. In addition, the PC hardware is connected with an external storage device 1606. The external storage device 1606 may be an HDD, an SSD, or an external storage device of another network-mounted system.

The processing program of the CPU 1601 that achieves the information processing apparatus and the information processing method of an embodiment is stored in the external storage device 1606, which may be an HDD or an SSD, or a storage portion (such as an EEPROM area) of the ROM 1602. In this case, the processing program of the CPU 1601 that achieves the information processing method (e.g., time-series-data display method) can be supplied to the above-described storage device or storage portion via a network interface 1607, and can be updated with a new program. In another case, the processing program of the CPU 1601 that achieves the information processing method can be supplied to the above-described storage device or storage portion via one of various storage media, such as a magnetic disk, an optical disk, and a flash memory, and its driving device; and can be updated. The storage medium, the storage portion, or the storage device that stores the processing program of the CPU 1601 that achieves the information processing method is a computer-readable recording medium for the information processing method or the information processing apparatus of the present invention.

The CPU 1601 is connected with the sensor 11, which is illustrated in FIG. 1. In FIG. 2, the sensor 11 is directly connected to the CPU 1601 for simplifying illustration. However, the sensor 11 may be connected to the CPU 1601 via IEEE 488 (so-called GPIB), for example. In another case, the sensor 11 may be communicatively connected to the CPU 1601 via the network interface 1607 and a network 1608.

The network interface 1607 may conform to wire communication standards such as IEEE 802.3, or wireless communication standards such as IEEE 802.11 or IEEE 802.15. The CPU 1601 communicates with external apparatuses 1104 and 1121 via the network interface 1607. For example, in a case where the time-series data from an industrial robot is displayed, the external apparatuses 1104 and 1121 may be a general control apparatus and a management server, such as a PLC and a sequencer, that are disposed for controlling and managing the industrial robot.

In the example illustrated in FIG. 2, an operation portion 1604 that corresponds to the input portion 140 of FIG. 1 and a display apparatus 1605 that corresponds to the display portion 130 are connected to the CPU 1601, as user interface devices (UI devices). The operation portion 1604 may be a terminal such as a handy terminal, or a device such as a key board, a jog dial, a mouse, a pointing device, or a voice input device (the operation portion 1604 may be a control terminal that includes the above-described devices). The display apparatus 1605 may be any device as long as the device can display, on its display screen, the information related to the process performed by the data extraction portion 112, the data joining portion 113, and the like. For example, the display apparatus 1605 may be a liquid-crystal display apparatus.

Figure 3:
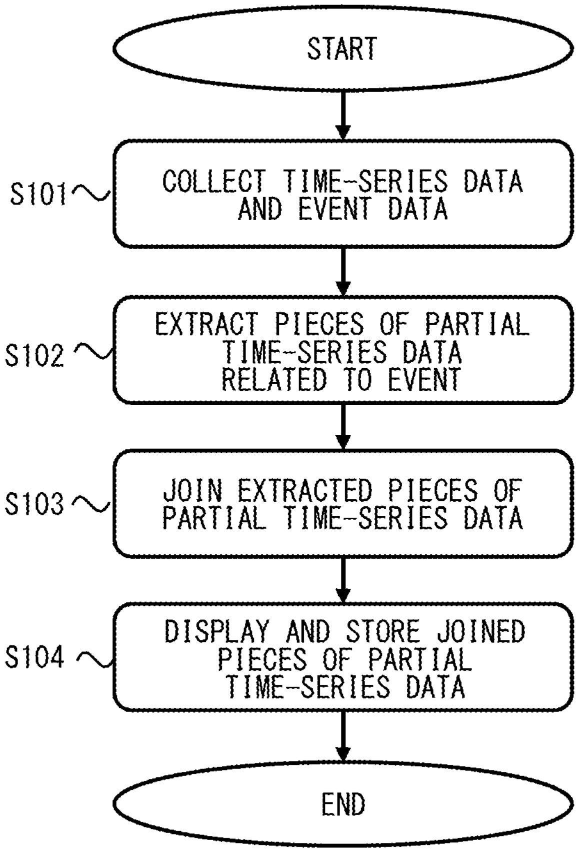
FIG. 3 is a flowchart for illustrating a control method of an embodiment.

Next, with reference to the flowchart of FIG. 3, an information processing method (time-series-data display method) performed by the time-series-data display apparatus 100 will be described. FIG. 3 illustrates one example of a procedure of processes performed by the time-series-data display apparatus 100.

In Step S101, the time-series-data display apparatus 100 collects time-series data and event data from the machine apparatus 100.

FIG. 4A illustrates one example of the time-series data collected by the time-series-data display apparatus 100. The example is a series of pieces of data measured by periodically sampling the driving current of an industrial robot, which is included in the machine apparatus 10. The data collection portion 111 of the time-series-data display apparatus 100 collects such pieces of time-series data from the sensor 11 of the machine apparatus 10, and stores the data in the time-series-data storage portion 121.

Figure 5:
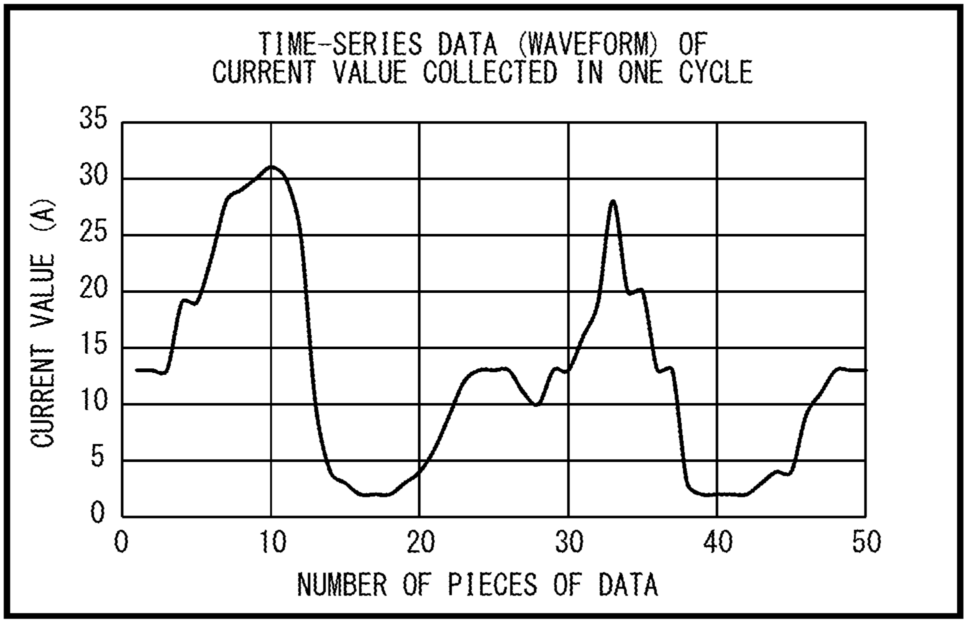
FIG. 5 is a graph illustrating an example of time-series data of one of repeated operations, collected from a machine apparatus.
Figure 6A:
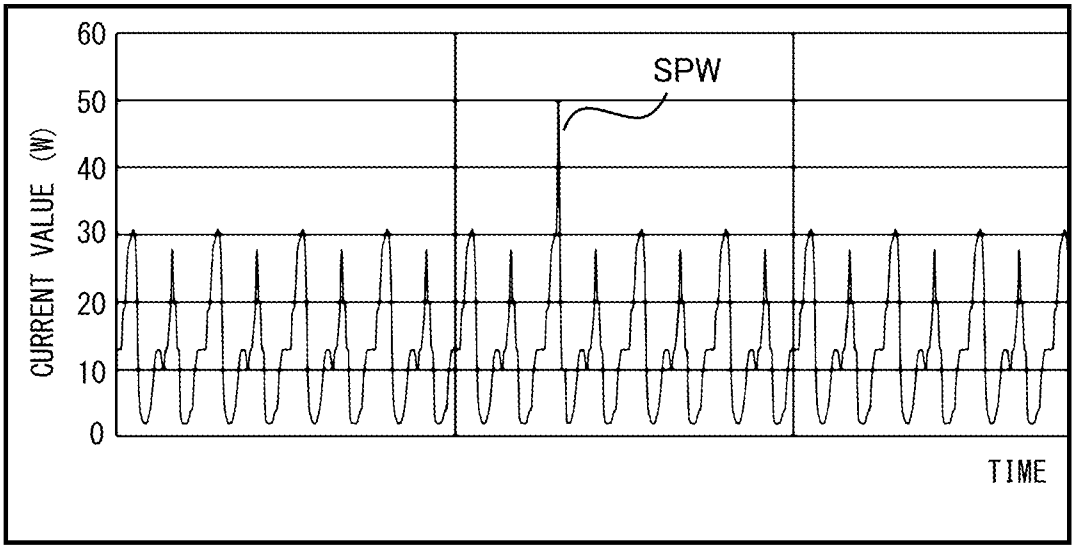
FIG. 6A is a graph illustrating an example of time-series data collected when the repeated operations were continuously performed.
Figure 6B:
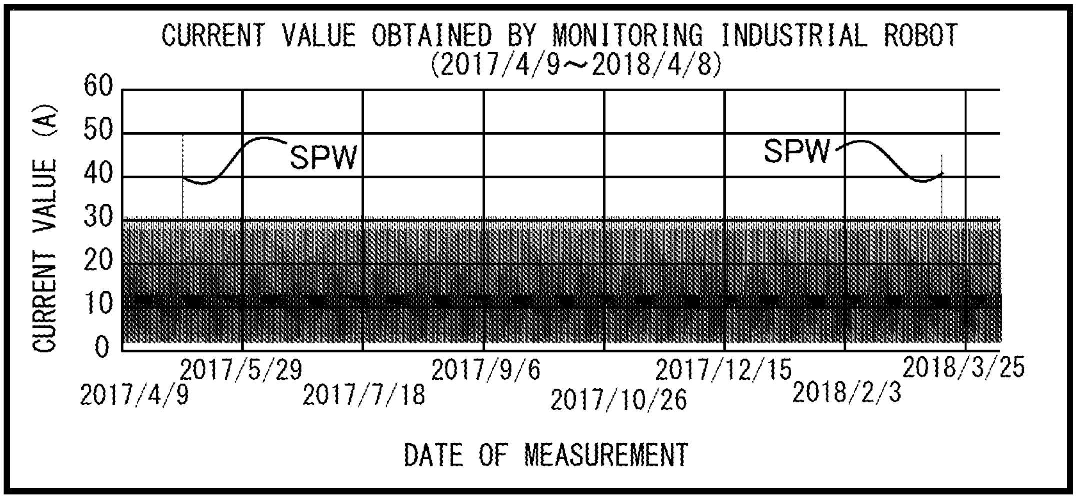
FIG. 6B is a graph illustrating time-series data collected in a long period of time and displayed, compressed in the time-axis direction.

Hereinafter, the time-series data collected by the data collection portion 111 will be more specifically described. FIG. 5 illustrates a graph of current waveform, obtained from time-series data in one cycle of normal operations of the industrial robot, which is included in the machine apparatus 10. FIG. 6A illustrates a graph of current waveform, obtained from time-series data collected when the industrial robot was continuously performing cycle operations. In FIG. 6A, the graph contains a waveform SPW whose amplitude is different from others. FIG. 6B is a graph illustrating time-series data collected in a long period of time and displayed, compressed more in the time-axis direction than the time-series data illustrated in FIG. 6A. In FIG. 6B, it can be seen that the graph contains two waveforms, SPWs, whose amplitudes are different from others. However, since the waveform of cycle operations is compressed in the time-axis direction, it is impossible to perform detailed check and comparison on waveforms.

FIG. 4B illustrates one example of event data collected by the time-series-data display apparatus 100. The event was set as a stop the industrial robot, which is included in the machine apparatus 10, and the event data was recorded as a time at which the event occurred. In this example, the event is a stop of the robot caused by a maintenance work that is performed regularly or irregularly, or a stop of the robot caused by a failure of the robot that occurs irregularly. The data collection portion 111, while collecting the time-series data, collects the event data by receiving control information from a control portion that manages the operation of the machine apparatus 10, and stores the event data in the event-data storage portion 122.

Referring back to FIG. 3, in Step S102, the data extraction portion 112 extracts a piece of partial time-series data that is related to an event, from the time-series data stored in the time-series data storage portion 121. The event is freely selected by a worker (operator) from the event data stored in the event-data storage portion 122. However, the event may be automatically selected by the control portion 110.

For example, the data extraction portion 112 extracts from the time-series data of FIG. 4A, a piece of partial time-series data related to an event selected from the event data of FIG. 4B. Specifically, the data extraction portion 112 extracts a piece of the time-series data, as partial time-series data, contained in a cycle preceding the cycle in which the selected event occurred (i.e., the industrial robot stopped). Note that the above-described extraction is one example. For example, the data extraction portion 112 may extract a piece of the time-series data, as partial time-series data, contained in a cycle that precedes the cycle in which the selected event occurred, by a predetermined number of operation cycles. In another case, the data extraction portion 112 may collectively extract pieces of the time-series data, as partial time-series data, contained in a plurality of consecutive operation cycles. In still another case, the data extraction portion 112 may extract a piece of the time-series data, as partial time-series data, contained in the cycle itself in which the selected event occurred. The extracted piece of partial time-series data is stored in the extracted-data storage portion 123, together with time information related to the extracted piece of partial time-series data.

Figure 7:
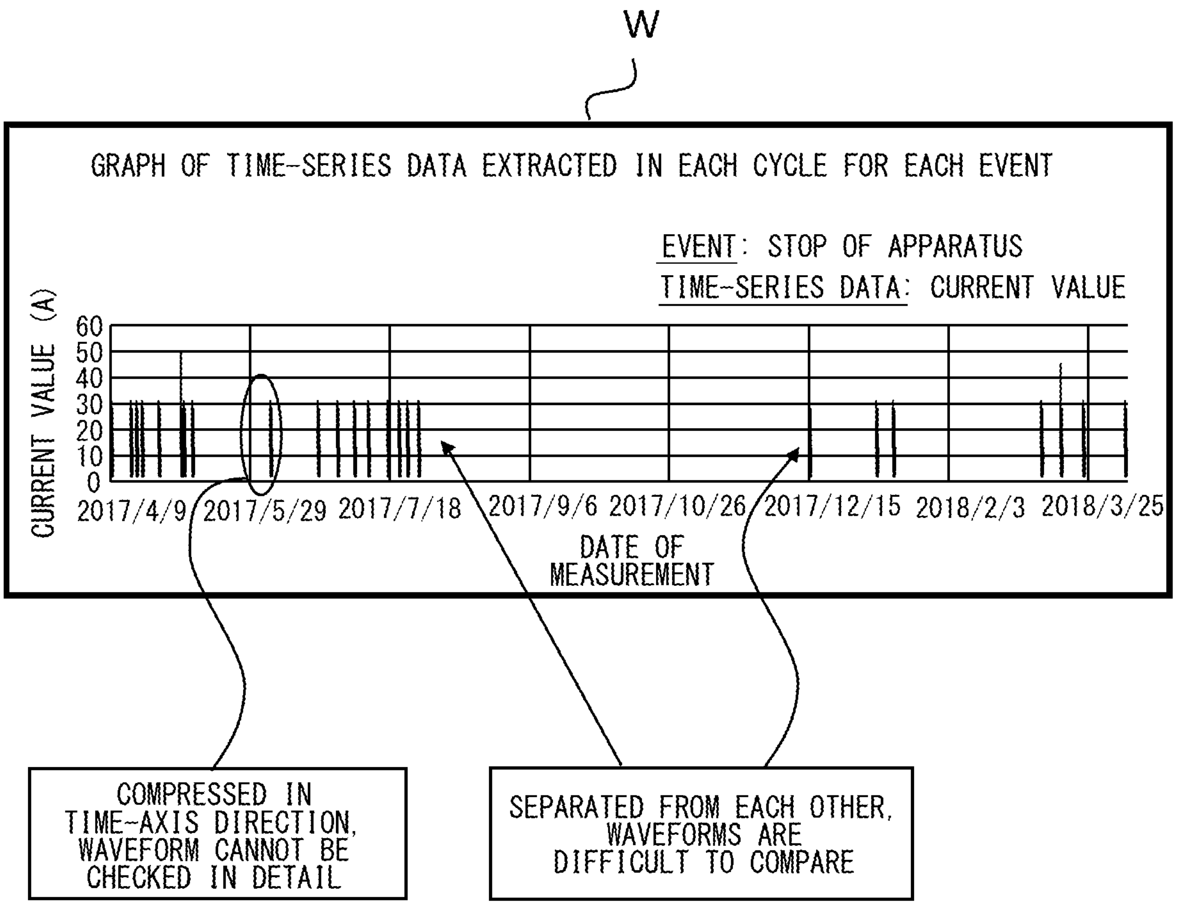
FIG. 7 is an example in which extracted pieces of partial time-series data are located and displayed on a linear scale (that is, an absolute time axis) that represents time as an index.

By the way, assume that the extracted pieces of partial time-series data are arranged on a linear scale (that is, absolute time axis) that represents time as an index. FIG. 7 schematically illustrates a display screen W. In the graph, since most of the time-series data in the continuous operation was not extracted, the unextracted pieces of the time-series data are not plotted, and only the waveforms of partial time-series data related to a type of events are shown. Thus, it can be said that the redundancy is significantly reduced, compared to the graph of FIG. 6B. However, if the time-series data is collected in a long period of time, the waveform of pieces of partial time-series data will be compressed and deformed in the time-axis direction, on the display screen W. Thus, the detail of the waveform cannot be checked. If the waveform is expanded in the time-axis direction for easily observing the waveform and comparing waveforms of pieces of partial time-series data, the waveform may extend off the screen. This is because the waveforms of pieces of partial time-series data are separated from each other and located at irregular intervals.

Thus, in the embodiment, in Step S103, the data joining portion 113 that serves as a processing portion joins the pieces of partial time-series data stored in the extracted-data storage portion 123, and stores the joined data in the joined-data storage portion 124. That is, the data joining portion 113 creates an image (joined data) in which the extracted pieces (e.g., graphs) of partial time-series data are arranged closer to each other, compared to the case where the extracted pieces of partial time-series data are arranged on the linear scale that represents time as an index. Specifically, the data joining portion 113 arranges the pieces (e.g., graphs) of partial time-series data such that one piece of partial time-series data is joined with an adjacent piece of partial time-series data, or that one piece of partial time-series data is disposed adjacent to another piece of partial time-series data, with a short space interposed therebetween. For example, the data joining portion 113 performs image processing so that the distance between a waveform of one piece of the partial time-series data of FIG. 7 and a waveform of an adjacent piece of the partial time-series data in the horizontal-axis direction has a value of zero or a predetermined small value. In this manner, the data joining portion 113 makes the distance between the waveforms shorter.

In Step S104, the time-series-data display apparatus 100 displays the graph on the display portion 130 by using the joined data, which is stored in the joined-data storage portion 124. The graph can be expanded in the horizontal-axis direction, if necessary, for facilitating observation and comparison of waveforms. Preferably, the index (scale) of the horizontal axis of the graph is not the absolute time, but the number of samples of original measurement data, the number of operation cycles, or the like. As described above, the pieces of partial time-series data, which were originally separated from each other and located at irregular intervals, are disposed adjacent to each other. Thus, if the index (scale) of the horizontal axis is the absolute time in the graph, a value of the index will discontinuously jump at a boundary between one piece of partial time-series data and another piece of partial time-series data, making it difficult for a worker to easily understand the graph intuitively.

Note that in Step S104, the time-series-data display apparatus 100 may not display the created image on the display portion 130. Instead, the time-series-data display apparatus 100 may send the image to another display apparatus other than the time-series-data display apparatus 100 and causes the other display apparatus to display the image, or may send the image to a printing apparatus and causes the printing apparatus to print the image. That is, time-series-data display apparatus 100 may select a method of outputting the created image, in accordance with convenience of a worker (operator).

Figure 8:
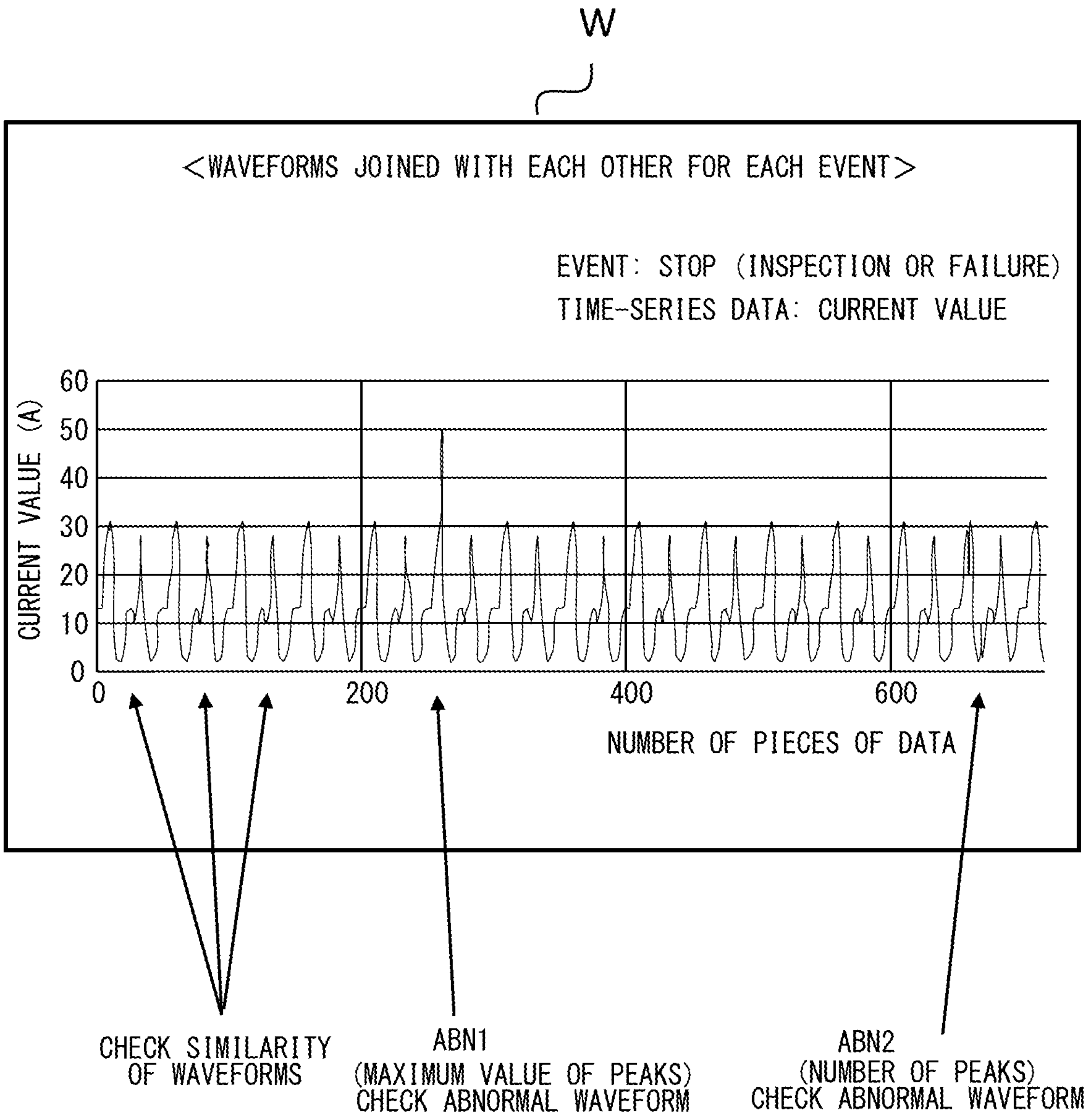
FIG. 8 illustrates one example of displayed images of an embodiment.

FIG. 8 illustrates an image, as an example, displayed on the display screen W of the display portion 130 in Step S104. In FIG. 8, one piece of partial time-series data related to a type of events is joined with another piece of partial time-series data in the horizontal-axis direction, so as to be adjacent to each other. That is, the event data corresponds to a stop of an industrial robot; a piece of partial time-series data is extracted for each event, from the time-series data obtained by monitoring current value of the industrial robot; and pieces of partial time-series data are joined with each other in the graph. Thus, the graph shows only the pieces of partial time-series data related to the occurrence of the events, and that are joined with each other. Consequently, a worker (operator) can easily perform check and comparison on the waveforms (graphs) related to the occurrence of the events.

For example, if the event (stop) is caused by the inspection performed on a normal-state machine apparatus, the waveform of a piece of partial time-series data becomes similar to the waveform of FIG. 5, which is a waveform of one operation cycle of the normal-state machine apparatus. Thus, in the displayed image of an embodiment illustrated in FIG. 8, a worker (operator) can easily check the similarity of the waveform. If the event (stop) is caused by the failure of the machine apparatus, the waveform of a piece of partial time-series data becomes an abnormal waveform, like ABN1 or ABN2 illustrated in FIG. 8, dissimilar to the normal waveform. Thus, such an abnormal waveform dissimilar to the normal waveform can be easily found, and compared with other waveforms related to the event. Therefore, a worker (operator) can easily extract the learning data for creating a failure prediction model.

The example of FIG. 8 is involved with a case in which the extraction condition (predetermined event) in Step S102 includes both of a stop caused by the inspection for the normal-state machine apparatus and a stop caused by the failure of the machine apparatus. However, a worker can change the extraction condition (predetermined event) of Step S102, in accordance with an object of the work. For example, if a worker desires to perform comparison on only the waveforms related to the stop caused by failure and study the correlation between the cause of failure and the waveform, the worker can set the stop caused by failure, as the event that serves as an extraction condition of Step S102.

Figures 9A, 9B:
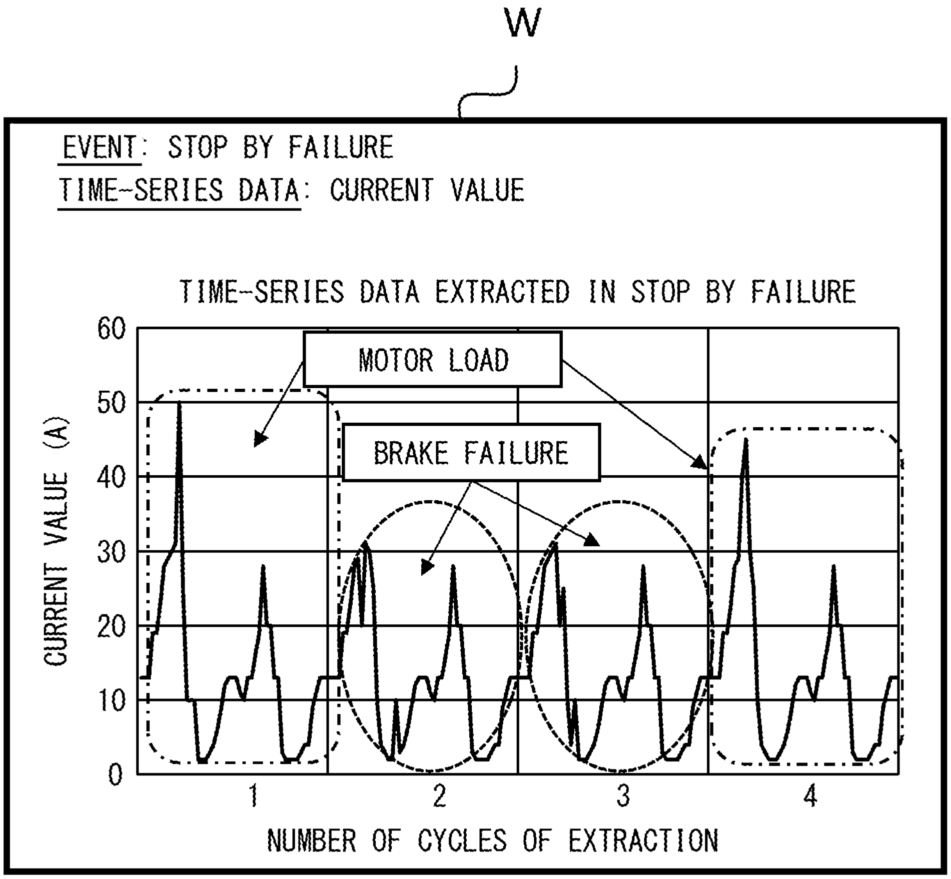
FIG. 9A illustrates one example of displayed images of an embodiment, obtained in a case where the event is a stop caused by failure.
FIG. 9B illustrates one example of information on events stored.

As an example, FIG. 9A illustrates a displayed image obtained by setting the stop caused by failure, as the event. In the image, one waveform of one piece of partial time-series data related to the event is joined with another waveform of another piece of partial time-series data in the horizontal-axis direction so as to be adjacent to each other. In this example, the index of the horizontal axis is the number of operation cycles, and the graph is provided with a vertical line at a position at which one waveform is joined with another, so that the boundary between the events can be easily recognized FIG. 9B illustrates detailed information related to the events stored in the event-data storage portion 122. In FIG. 9A, detailed information on the events illustrated in FIG. 9B is shown, associated with corresponding waveforms of pieces of partial time-series data. Thus, a worker (operator) can easily understand from the waveforms displayed on the screen and the detailed information on the events, that when the machine apparatus is failed and stopped by an excessive motor load, the maximum value of peaks of the waveform increases abnormally, as a sign of the failure. In addition, a worker (operator) can easily understand that when the machine apparatus is failed and stopped by the failure of a brake, the number of peaks observed in one operation cycle increases, as a sign of the failure. Thus, a worker (operator) can easily understand the characteristics of each piece of partial time-series data extracted by using a corresponding event, by checking the event in detail that was used for extracting the partial time-series data. Consequently, the worker (operator) can easily determine whether the piece of partial time-series data can be used as the learning data of the machine learning. Therefore, the worker (operator) can efficiently and easily extract the learning data for creating a failure prediction model.

In addition, for increasing the work efficiency of the worker (operator), an input area in which the worker (operator) can put information may be disposed in the image, in addition to the joined waveforms of pieces of partial time-series data and the detailed information related to the event. For example, a check box, a pull-down menu, a flag, and the like may be displayed in the image for the work of the worker (operator) to extract a waveform as the learning data. In another case, a box may be disposed in the image for the worker (operator) to write a comment or a memo.

Figure 10:
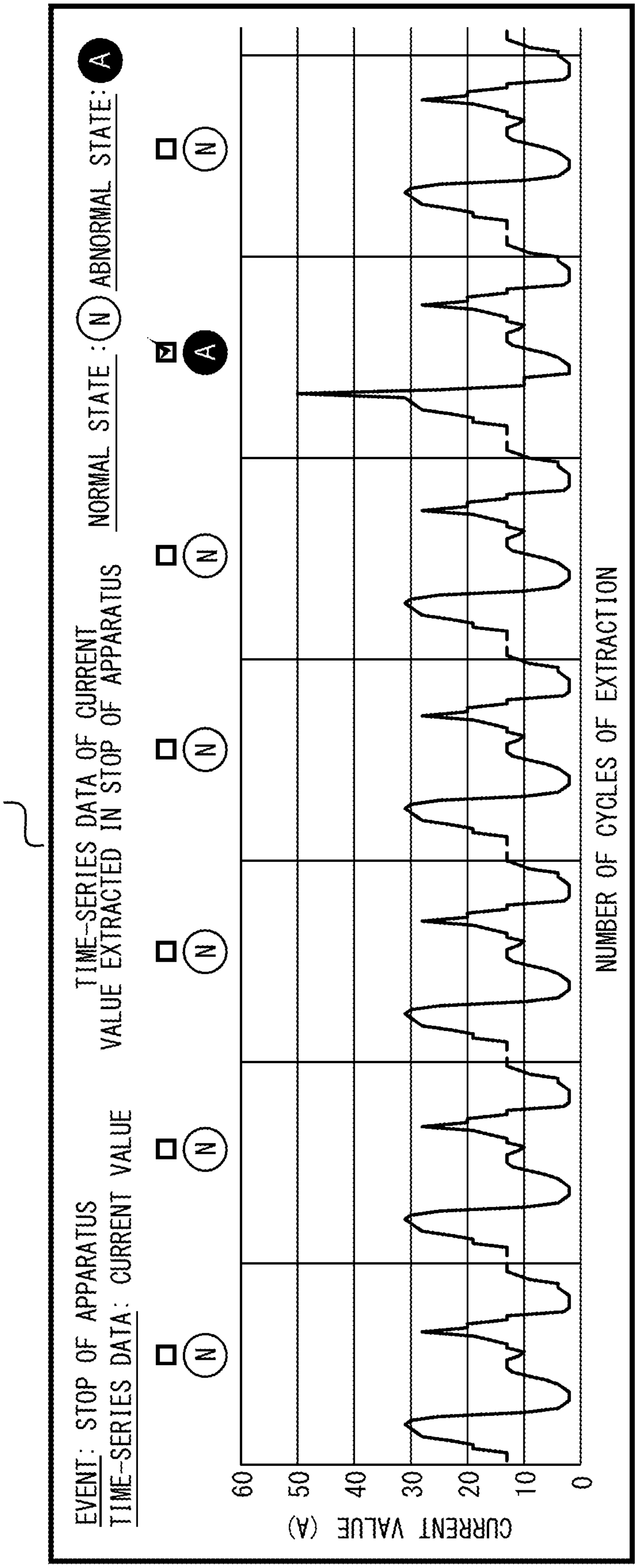
FIG. 10 illustrates another example of displayed images of an embodiment.

FIG. 10 illustrates another example of a displayed image of an embodiment. In this example, one piece (graph) of partial time-series data is disposed adjacent to another piece (graph) of partial time-series data, with a predetermined short space interposed therebetween, for a worker (operator) to visually recognize the boundary between the one piece of the partial time-series data and the other piece of partial time-series data with ease. In addition, each graph is provided with a mark, as a label, that represents information on the event. In this example, the mark indicates a subcategory of the stop (event) of the machine apparatus. Specifically, each mark indicates a stop of the machine apparatus in the normal state (e.g., stop caused by inspection), or a stop of the machine apparatus in an abnormal state (e.g., stop caused by failure). The marks are displayed, as labels, in the image, associated with respective graphs. Above each label, a check box is displayed for determining whether a corresponding waveform is used as the learning data for creating a failure prediction model. The labels and the check boxes may be displayed by a worker (operator) instructing the time-series-data display apparatus 100 via the input portion 140, or may be automatically displayed by the control program.

In the above-described examples, pieces of partial time-series data related to a single type of physical quantity, such as current value, are extracted; and graphs of the pieces of partial time-series data are displayed adjacent to each other in the horizontal axis. However, the graphs displayed on a single screen may not be related to the pieces of partial time-series data related to a single type of physical quantity. That is, graphs related to pieces of partial time-series data related to a plurality of types of physical quantity may be displayed on an identical screen. In this case, since a worker (operator) can easily determine the correlation between different types of physical quantity related to the event, the graphs are convenient for extracting the learning data for creating a failure prediction model.

Figure 11:
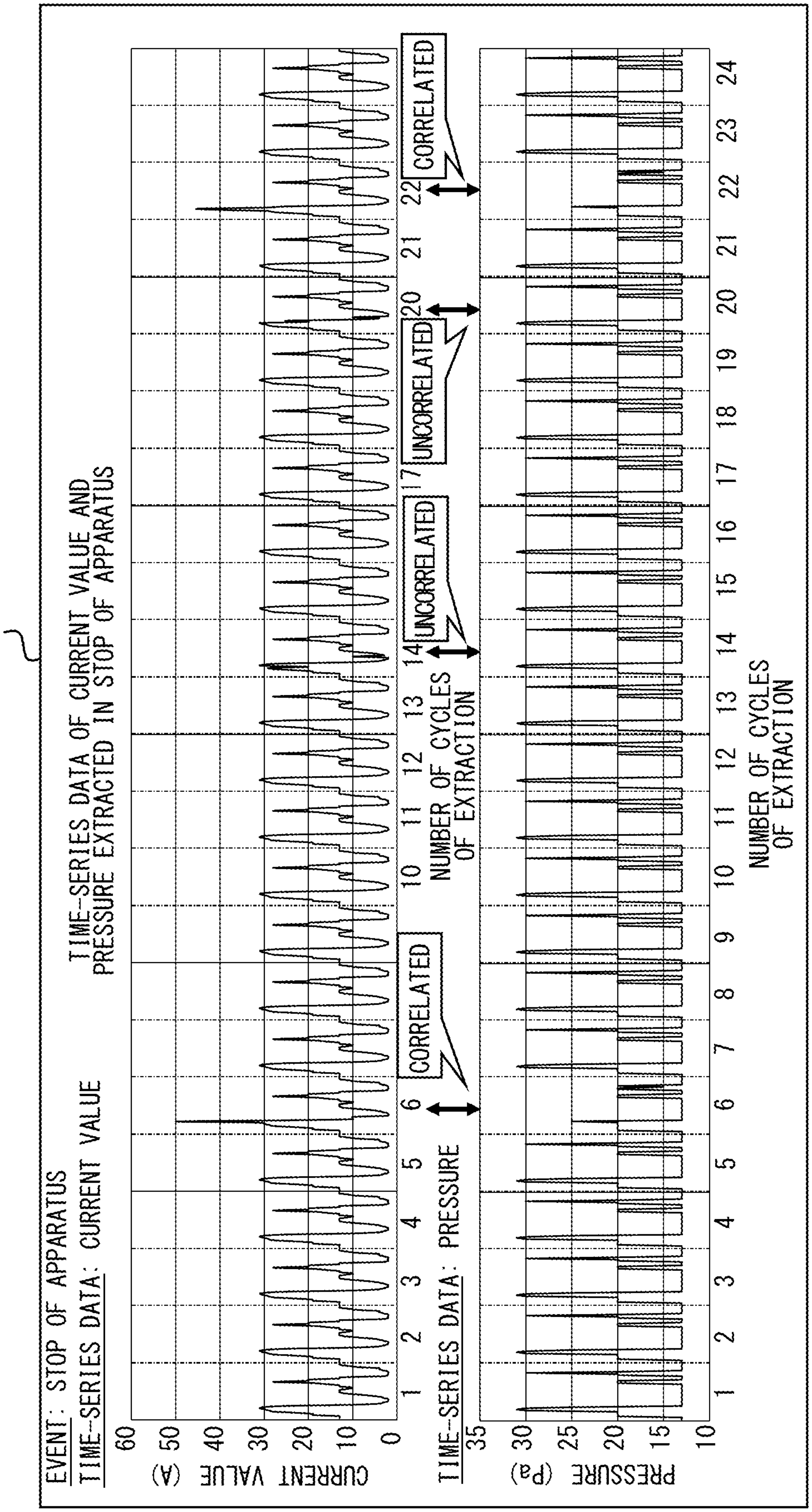
FIG. 11 illustrates still another example of displayed images of an example.

FIG. 11 illustrates another example of a displayed image of an embodiment. In this example, pieces of partial time-series data of current value and pressure related to the event of stop of the apparatus were extracted in Step S102 of the flowchart of FIG. 3. Then, in Step S103, the extracted pieces of partial time-series data were joined with each other for each of the current value and the pressure. In Step S104, the graph of current value and the graph of pressure were disposed vertically such that the events in the graph of current value were synchronized, in phase, with the events in the graph of pressure in the horizontal-axis direction. As a result, it is understood that if an abnormal waveform that causes an excessively high value of current peaks occurs, an abnormal waveform that causes an excessively low value of pressure peaks occurs. Thus, a worker can easily understand that the event causes high correlation between the current value and the pressure. In addition, it is understood that even if an abnormal waveform that increases the number of current peaks in one operation cycle occurs, a corresponding waveform of pressure remains normal. Thus, a worker can understand that the event causes less correlation between the current value and the pressure. As described above, the graph shows only the pieces of partial time-series data that are related to the occurrence of event, and that are joined with each other. Consequently, a worker (operator) can easily perform check and comparison on the graphs related to the occurrence of event. Therefore, a worker (operator) can efficiently and easily extract the learning data for creating a failure prediction model.

Example of Connection Between Time-Series-Data Display Apparatus and Robot

Figure 12:
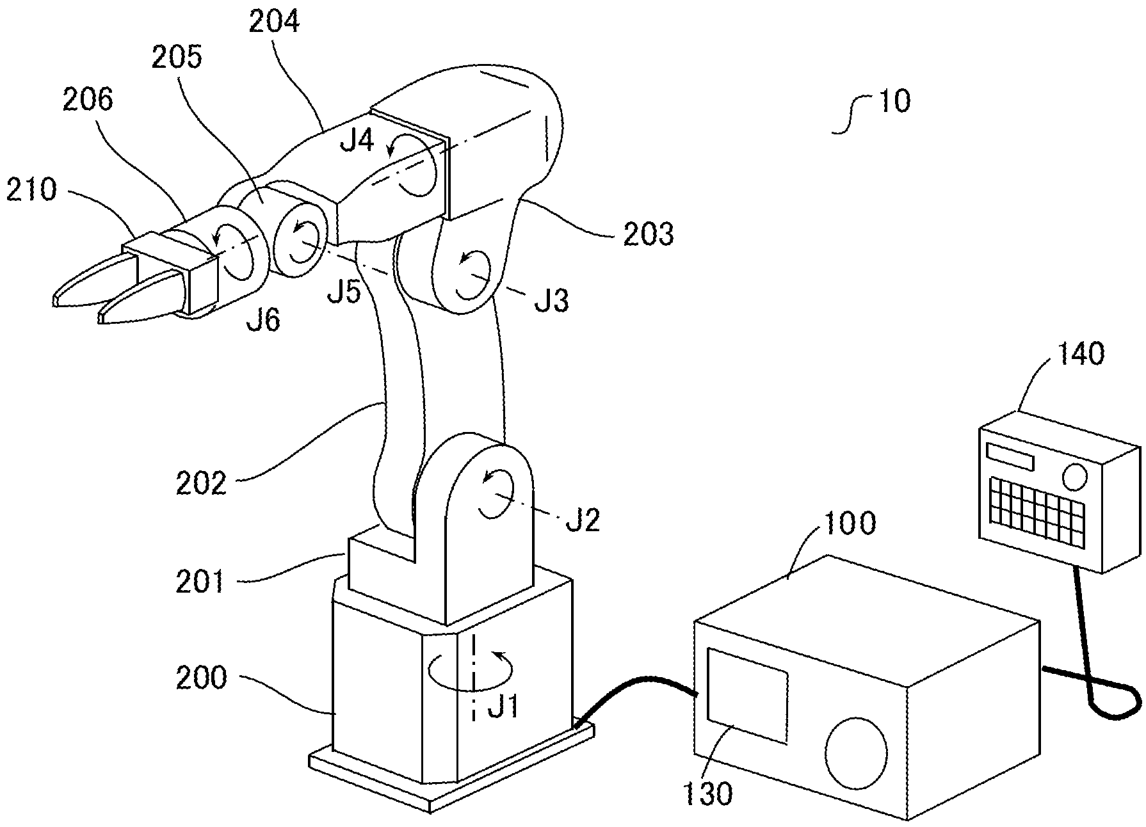
FIG. 12 is a diagram illustrating an example in which the time-series-data display apparatus of an embodiment is connected to a six-axis articulated robot.

FIG. 12 illustrates an example in which the time-series-data display apparatus 100 of an embodiment is connected to a six-axis articulated robot, which is one example of the machine apparatus 10.

Links 200 to 206 of the six-axis articulated robot are serially linked with each other via six rotary joints J1 to J6. The six-axis articulated robot includes a sensor that measures the rotational speed of a motor of a corresponding rotary joint, a sensor that measures the rotation angle of a corresponding joint, a torque sensor, a sensor that measures the current of a corresponding motor, and a pressure sensor that measures the pressure of air that drives an actuator. An actuator, such as a robot hand 210, can be detachably attached to a distal-end link.

The six-axis articulated robot is communicatively connected with the time-series-data display apparatus 100 of an embodiment. The time-series-data display apparatus 100 collects the time-series data of a physical quantity related to the state of the robot, and the event data related to an event that has occurred in the robot.

For example, the six-axis articulated robot repeatedly performs operations for assembling components into a product. An operator can instruct the time-series-data display apparatus 100 via the input portion 140 and cause the time-series-data display apparatus 100 to form an image, which can be displayed or printed.

For example, when the six-axis articulated robot performs operations for manufacturing products, an image in which pieces of partial time-series data related to a selected event (e.g., failure) are joined with each other can be formed, and displayed on the display portion 130. Since the displayed image allows an operator to easily check the history of the robot related to the event, the operator can determine, for example, whether to make the robot continue to manufacture the products. Thus, with the time-series-data display apparatus 100 of the present invention that is connected to a manufacturing apparatus, such as a robot, and that displays the partial time-series data, products can be manufactured while the stop by failure of the manufacturing apparatus can be prevented.

In addition, an operator can make training data (learning data) for creating a learned model for predicting a failure of a robot, by using the time-series-data display apparatus 100. The operator can select an event from the event data acquired by the time-series-data display apparatus 100, cause the time-series-data display apparatus 100 to extract pieces of partial time-series data related to various types of physical quantity, and cause the time-series-data display apparatus 100 to display an image in which the operator can easily perform comparison and the like, on the graphs. For example, if the check box illustrated in FIG. 10 is used, an operator can easily set a flag to a piece of data that the operator has determined to be suitable for the training data of machine learning. Thus, the operator can easily make the training data (learning data).

Note that the present invention is not limited to the above-described embodiments, and can be variously modified within the technical concept of the present invention.

For example, the embodiments of the present invention are not limited to a graph of physical quantity related to a single type of events. For example, in Step S102 of the flowchart of FIG. 3, a plurality of types of events may be set as an extraction condition. Then, in Step S103, for each of the plurality of type of events, pieces of partial time-series data of physical quantity may be extracted, and a graph in which the pieces of partial time-series data are joined with each other along the horizontal axis may be formed. In Step S104, the graphs may be displayed in a single screen, adjacent to each other. The graphs are convenient for an operator to study the correlation between different types of events for the physical quantity.

In addition, although the description has been made in the present embodiment for the case where the machine apparatus 10 is a six-axis articulated robot as one example, the present disclosure is not limited to this. For example, the machine apparatus 10 may be a machine apparatus that can automatically perform expansion and contraction, bending and stretching, up-and-down movement, right-and-left movement, pivot, or combined movement thereof, in accordance with information stored in the storage device of the control device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method comprising:

acquiring, by an information processing apparatus, time-series data of a plurality of types of physical quantity related to a state of a machine apparatus performing a repetitive operation;

extracting, by the information processing apparatus, at least two pieces of first partial time-series data corresponding to events occurring in the machine apparatus during the repetitive operation from the plurality of time-series data without extracting a second partial time-series data which is located between the at least two pieces of first partial time-series data;

displaying, by the information processing apparatus, a first image in which the at least two pieces of first partial time-series data are combined without the second partial time-series data interposed between the at least two pieces of first partial time-series data; and displaying, by the information processing apparatus, a second image in which the at least two pieces of first partial time-series data with the second partial time-series data interposed between the at least two pieces of first partial time-series data.

2. The information processing method according to claim 1, wherein in the extracting, at least two pieces of third partial time-series data corresponding to each of the at least two pieces of first partial time-series data respectively is extracted, and wherein, in the displaying, each of the at least two pieces of first partial time-series data and each of the at least two pieces of third partial time-series data are displayed in a corresponding manner in the image.

3. The information processing method according to claim 1, wherein, in the extracting, the at least two pieces of first partial time-series data is extracted depending on event data related to the events.

4. The information processing method according to claim 3, further comprising obtaining the event data relating to a plurality of types of events occurring in the machine apparatus, wherein, in the extracting, a plurality of pieces of first partial time-series data is extracted relating to a plurality of types of predetermined events selected from the plurality of types of events, and wherein, in the displaying, an information related to the plurality of pieces of first partial time-series data on the plurality of types of predetermined events is arranged in the first image.

5. The information processing method according to claim 3, wherein the first image contains information on the events.

6. The information processing method according to claim 3, wherein the events are set depending on a peak of the physical quantity.

7. The information processing method according to claim 6, wherein the events are set (i) when a value of the peaks becomes equal to or larger than a predetermined threshold, (ii) when a number of the peaks becomes equal to or larger than a predetermined number, or (iii) both when a value of the peaks becomes equal to or larger than a predetermined threshold and when a number of the peaks becomes equal to or larger than a predetermined number.

8. The information processing method according to claim 3, wherein the event data is data on a date and time at which the events occurred.

9. The information processing method according to claim 1, wherein the time-series data from which the at least two pieces of first partial time-series data have still not been extracted is located on a linear scale that represents time as an index.

10. The information processing method according to claim 1, wherein the image is displayed on a display portion.

11. The information processing method according to claim 1, wherein, in the displaying, the at least two pieces of first partial time-series data are arranged at a distance from each other in the image.

12. The information processing method according to claim 1, wherein the image contains an input area in which an operator puts information.

13. The information processing method according to claim 12, wherein the input area allows a label to be set, and the label indicates a category of the at least two pieces of first partial time-series data.

14. The information processing method according to claim 1, wherein, in the displaying, the at least two pieces of first partial time-series data are displayed in the first image regardless of a time axis in the time-series data before the at least two pieces of first partial time-series data are extracted.

15. The information processing method according to claim 1, wherein, in the displaying, the at least two pieces of first partial time-series data is displayed in the first image according to a sampling number or a number of operation cycles of the repetitive operation.

16. An information processing apparatus comprising:

a processor configured to function as:

an acquire portion configured to acquire a plurality of time-series data of a plurality of types of physical quantity relating to a state of a machine apparatus performing a repetitive operation;

an extract portion configured to extract at least two pieces of first partial time-series data corresponding to events occurring in the machine apparatus during the repetitive operation from the plurality of time-series data without extracting a second partial time-series data which is located between the at least two pieces of the first partial time-series data;

a data joining portion configured to create a joined-data in which the at least two pieces of the first partial time-series data are joined with each other; and a display portion configured to display a first image in which the at least two pieces of the first partial time-series data are combined, wherein the display portion is configured to display a second image in which the second partial time-series data is located between the at least two pieces of the first partial time-series data.

17. A computer-readable non-transitory recording medium storing a program that causes a computer to execute the information processing method according to claim 1.

18. A method of manufacturing products, comprising:

acquiring, by the information processing apparatus according to claim 16, the time-series data when the machine apparatus performs operations for manufacturing products; and displaying, by the information processing apparatus according to claim 16, the first image.

19. A method of acquiring learning data comprising:

creating, by the information processing apparatus according to claim 16, the first image; and displaying, by the information processing apparatus according to claim 16, the first image for an operator to acquire learning data for creating a learned model that predicts a failure of the machine apparatus.

* * * * *